United States Patent Office.

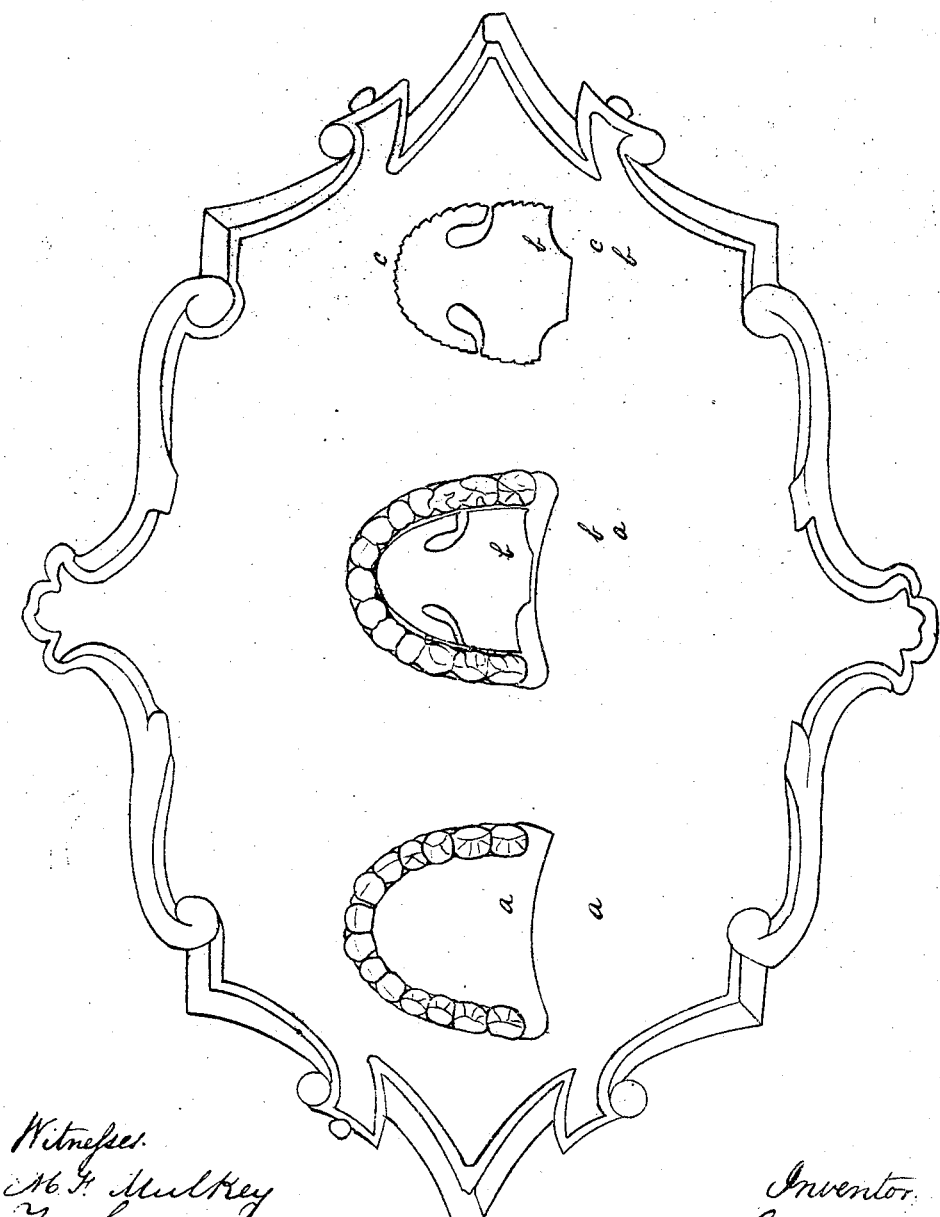
G. W. Cool
Dental Substitute.
N° 71707   Patented Dec. 3, 1867
Witnesses:
N. F. Mulkey
W. Lairkill
Inventor:
George W. Cool

GEORGE W. COOL, OF PORTLAND, OREGON.

Letters Patent No. 71,707, dated December 3, 1867.

IMPROVEMENT IN DENTAL SUBSTITUTES.

*The Schedule referred to in these Letters Patent and making part of the same.*

TO ALL WHOM IT MAY CONCERN:

Be it known that I, GEORGE W. COOL, of the city of Portland, in the county of Multnomah, and State of Oregon, have invented a new and improved Combined Dental Substitute, it being a new and improved mode of forming plates for the roof of the mouth, for holding in place artificial teeth; and I do hereby declare that the following is a full and exact description thereof, reference being had to the accompanying drawings, and the letters of reference marked thereon.

The nature of my improvement consists in the mode, herein described, of attaching and fastening a thin plate or lining of gold, or other malleable substance, to the vulcanized or other dental plate, of the kinds heretofore in use, which thin plate or lining is by my said mode fastened to the vulcanite or other dental plate in the following manner: The said thin plate or lining being so shaped as to fit on the inner or concave surface of the vulcanite or other dental plate, in conformity with the shape of the mouth, is, by incisions running diagonally to its edge, furnished throughout the extent of all its edges, with small teeth or points, resembling the teeth of a saw. These teeth are turned upward or toward the convex side of the vulcanite or other dental plate, each tooth being turned also to one side with a curl or twist. These points or teeth proceeding from the thin plate or lining, into the vulcanite or other dental plate, act as clenched holders, to fasten the thin plate or lining to the vulcanite or other dental plate.

The figure or plate in said drawing marked $a$ represents a vulcanite plate.

The figure marked $b$ is a thin plate or lining of gold, or other malleable substance. $c$ is intended to represent the fastenings, in the form of saw-teeth, around all the edges of the plate or lining $b$.

The figure marked $a\ b$ represents a vulcanite plate, with the thin plate or lining of gold, combined therewith, and fastened according to the manner above specified.

The plate marked $b$ is made in a form resembling an anchor, as seen in the drawing, that form being readily adapted to the convex shape of the vulcanite plate, and is capable of a very smooth finish.

The advantages of my method of combining the gold lining with the vulcanite or other dental plate heretofore in use, are the following: The vulcanite can be made much thinner, and have greater strength. This mode stays the vulcanite and prevents it from splitting, which frequently occurs in the common vulcanite plate. The food has not the same tendency to adhere to the plate, with my mode of fastening, as to plates heretofore in use. The plate with this mode of fastening has all the advantages of a gold plate, with less labor and expense. This mode of fastening renders the plate more pleasant to the wearer, and renders the plate more durable than other modes.

What I claim as my invention, is—

The mode of fastening the thin plate or lining to the vulcanite or other dental plate heretofore in use, in the manner above described.

G. W. COOL.

Witnesses:
W. W. UPTON,
H. C. SMALL.